(No Model.)
H. OLSON.
HORSESHOE.
No. 272,750. Patented Feb. 20, 1883.
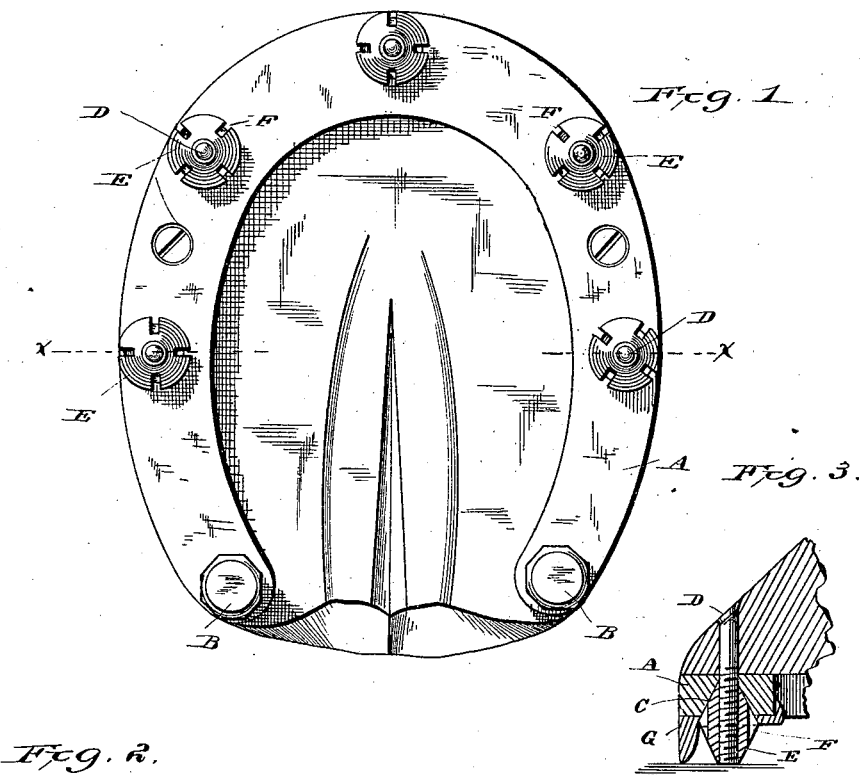
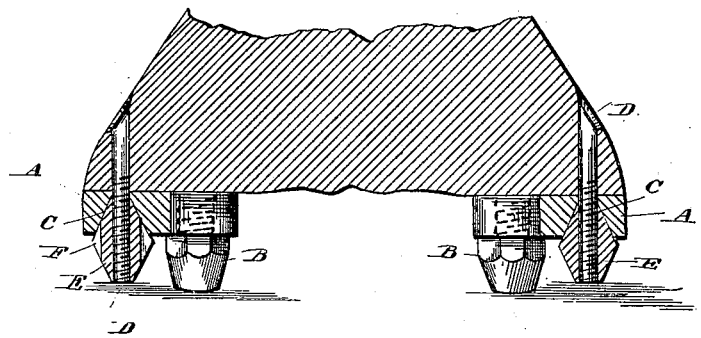
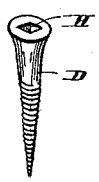
Witnesses
Edwin L. Yewell.
J. J. McCarthy
Inventor.
Holcom Olson.
C. M. Alexander.
Attorney.

UNITED STATES PATENT OFFICE.

HOLCOM OLSON, OF MARIADAHL, KANSAS.

HORSESHOE.

SPECIFICATION forming part of Letters Patent No. 272,750, dated February 20, 1883.

Application filed December 13, 1882. (No model.)

*To all whom it may concern:*

Be it known that I, HOLCOM OLSON, of Mariadahl, in the county of Pottawatomie, and in the State of Kansas, have invented certain new and useful Improvements in Horseshoes; and I do hereby declare that the following is a full, clear, and exact description thereof, reference being had to the accompanying drawings, and to the letters of reference marked thereon, making a part of this specification.

This invention relates to certain improvements in horseshoes; and it has for its object to provide improved means for securing the shoe to the hoof of the animal by means of a series of bolts and calks, as more fully hereinafter specified.

In the accompanying drawings, Figure 1 represents a view of the bottom of the hoof, showing my invention; Fig. 2, a vertical section taken through the hoof on the line $x$ $x$ of Fig. 1. Fig. 3 shows a sectional view of a modification of my invention, showing an improved toe-calk; and Fig. 4, a modification of the screw-bolt by means of which the calks and shoe are secured.

The letter A indicates the horse-shoe, which is provided with heel-calks B, which are constructed of hardened metal with threaded shanks, which may be screwed into threaded apertures at the heel of the shoe provided for the purpose. The said calks are preferably in the form of the frustum of a cone, the bases setting against the lower face of the shoe. This construction prevents the cutting of the legs of the animal in case the animal should strike them in traveling. The shoe is provided with a series of apertures, C, which are preferably equidistant from each other, and which are countersunk from the lower face of the shoe. The edge of the hoof is bored vertically, or nearly so, at intervals to correspond with the apertures in the shoe. Through these apertures are passed the bolts D, which are screw-threaded at their lower ends, and are headed at their upper ends, as shown. The bolts extend through the apertures in the shoe, below the lower face of the same, and are provided with removable calks E, which are formed with double conical faces, the upper faces being adapted to set in the countersunk apertures in the shoe, and the lower faces to project below the lower face of said shoe, as indicated. The calks, at their sides, are provided with slots F, which form bearings for a properly-shaped screw-driver, by means of which they may be screwed up tight on the bolts.

In applying my improved shoe, the lower face of the hoof is pared down, so that the shoe will fit neatly thereon. The shoe is then placed in position, and the bolts are inserted. The calks are then screwed home, fastening the shoe securely to the hoof.

In the modification shown in Fig. 3 an additional toe-calk, G, is employed, which consists of a piece of steel or hardened metal, having a downwardly-projecting rim at the front and an upwardly-projecting rim at the rear, the first-mentioned rim being designed to "take into" the ground, while the last-mentioned rim sets against the inner edge of the shoe. The said calk is provided with a beveled aperture, through which the bolt passes, and is fastened to the bolt by means of the double conical calks before mentioned, as shown in Fig. 3.

In the modification shown in Fig. 4 the screw-bolt is provided with a key-seat, H, for the insertion of a suitable key, by means of which it may be held while the calks are being applied.

Having thus described my invention, what I claim, and desire to secure by Letters Patent, is—

1. In combination with the shoe provided with countersunk apertures and the headed screw-bolts, the double-frustum-shaped screw-threaded calks adapted to set in the countersunk apertures in the shoe at one end, and to project below the face of the shoe at the other, the said calks being secured upon the bolts to hold the shoe to the hoof, substantially as specified.

2. In combination with the shoe provided with countersunk apertures and the screw-bolts and double-frustum-shaped calk, the toe-calk secured to the forward bolt and toe of the shoe by means of the double-frustum-shaped calk, substantially as specified.

In testimony whereof I affix my signature, in presence of two witnesses, this 7th day of November, 1882.

HOLCOM OLSON.

Witnesses:
OSCAR FAGERBERG,
C. W. FAGERBERG.